United States Patent
Ayres et al.

(10) Patent No.: US 9,884,546 B2
(45) Date of Patent: Feb. 6, 2018

(54) CRYOGENIC ENGINE SYSTEM

(71) Applicant: DEARMAN ENGINE COMPANY LTD, Croydon (GB)

(72) Inventors: Michael Ayres, London (GB); Henry Clarke, London (GB); Michael Dearman, Bishops Stortford (GB)

(73) Assignee: Dearman Engine Company Ltd, London (GB)

( * ) Notice: Subject to any disclaimer, the term of this patent is extended or adjusted under 35 U.S.C. 154(b) by 155 days.

(21) Appl. No.: 14/760,112

(22) PCT Filed: Jan. 13, 2014

(86) PCT No.: PCT/GB2014/050089
§ 371 (c)(1),
(2) Date: Jul. 9, 2015

(87) PCT Pub. No.: WO2014/108706
PCT Pub. Date: Jul. 17, 2014

(65) Prior Publication Data
US 2015/0352940 A1 Dec. 10, 2015

(30) Foreign Application Priority Data
Jan. 11, 2013 (GB) .................................. 1300496.5

(51) Int. Cl.
*B60K 6/00* (2006.01)
*B60K 3/02* (2006.01)
(Continued)

(52) U.S. Cl.
CPC .................. *B60K 6/00* (2013.01); *B60K 3/02* (2013.01); *B60K 3/04* (2013.01); *B60W 20/40* (2013.01);
(Continued)

(58) Field of Classification Search
CPC .... B60K 3/00–3/04; B60K 6/00–6/547; B60K 6/52; B60K 6/08; B60K 6/12;
(Continued)

(56) References Cited

U.S. PATENT DOCUMENTS 3,938,335 A   2/1976  Marwick
4,197,712 A * 4/1980  Zwick .................. F17C 9/02
                                                      60/618

(Continued)

FOREIGN PATENT DOCUMENTS

EP    2336537 A1    6/2011
JP    55148907 A   11/1980
(Continued)

OTHER PUBLICATIONS

First Office Action issued connection with Chinese Application No. 201480004716.7, dated Dec. 24, 2015.
(Continued)

*Primary Examiner* — Mark Laurenzi
*Assistant Examiner* — Xiaoting Hu
(74) *Attorney, Agent, or Firm* — Meunier Carlin & Curfman LLC

(57) ABSTRACT

A system (100) comprises a cryogenic engine (16) and a power generation apparatus, wherein the cryogenic engine and the power generation apparatus are coupled with each other to permit the cryogenic engine (16) and the power generation apparatus to work co-operatively with each other in a synergistic manner. The cryogenic engine (16) and the power generation apparatus are mechanically and optionally thermally coupled with each other so that the output means is shared between the cryogenic engine (16) and the power generation apparatus and that the two systems can be
(Continued)

operated in the most power efficient manner and may also thermally interact to the potential advantage of both performance and economy.

20 Claims, 6 Drawing Sheets

(51) Int. Cl.
| | |
|---|---|
| *B60K 3/04* | (2006.01) |
| *B60W 20/00* | (2016.01) |
| *F01K 15/02* | (2006.01) |
| *F01K 23/14* | (2006.01) |
| *F01K 23/18* | (2006.01) |
| *F01K 25/10* | (2006.01) |
| *B60W 20/40* | (2016.01) |
| *F01K 3/00* | (2006.01) |
| *F01K 21/00* | (2006.01) |
| *F01K 21/02* | (2006.01) |
| *F01K 23/06* | (2006.01) |
| *F01K 23/10* | (2006.01) |
| *F01K 23/12* | (2006.01) |

(52) U.S. Cl.
CPC ............... *F01K 3/00* (2013.01); *F01K 15/02* (2013.01); *F01K 21/005* (2013.01); *F01K 21/02* (2013.01); *F01K 23/065* (2013.01); *F01K 23/10* (2013.01); *F01K 23/12* (2013.01); *F01K 23/14* (2013.01); *F01K 23/18* (2013.01); *F01K 25/10* (2013.01); *Y02E 20/14* (2013.01)

(58) Field of Classification Search
CPC ............ B60K 2006/123; F01K 25/10; F01K 23/00–23/18; F01K 23/065; F01K 23/10; F01K 23/12; F01K 23/14; F01K 15/02; F01K 3/10; F01K 15/00–15/045; F04C 2240/45; F28D 20/0034
See application file for complete search history.

(56) References Cited

U.S. PATENT DOCUMENTS

| | | | |
|---|---|---|---|
| 4,226,294 A | | 10/1980 | Latter et al. |
| 4,354,565 A | | 10/1982 | Latter et al. |
| 4,354,656 A | | 10/1982 | Kain |
| 4,359,118 A | | 11/1982 | Latter et al. |
| 6,041,877 A | * | 3/2000 | Yamada ................... B60K 6/40 180/242 |
| 6,202,782 B1 | | 3/2001 | Hatanaka |
| 6,891,850 B1 | | 5/2005 | Vandesteeg et al. |
| 6,981,850 B1 | * | 1/2006 | Maltbie .................... F22B 1/18 417/201 |
| 8,141,360 B1 | * | 3/2012 | Huber ...................... B60K 6/24 290/40 B |
| 2005/0167169 A1 | * | 8/2005 | Gering ............... B60H 1/00278 237/12.3 B |
| 2005/0252696 A1 | * | 11/2005 | Kaufman ................. B60K 6/12 180/2.2 |
| 2009/0165456 A1 | | 7/2009 | Masada |
| 2010/0083940 A1 | | 4/2010 | Vrazel |
| 2011/0023483 A1 | * | 2/2011 | Berger .................... F01K 15/02 60/618 |
| 2011/0219772 A1 | * | 9/2011 | Steuernagel ............. B60K 6/48 60/698 |
| 2011/0314839 A1 | * | 12/2011 | Brook .................... F02M 21/06 62/49.1 |
| 2013/0228151 A1 | * | 9/2013 | Dunn ................. F02M 21/0209 123/294 |
| 2014/0299101 A1 | * | 10/2014 | Melanson ................. F17C 5/06 123/445 |

FOREIGN PATENT DOCUMENTS

| | | |
|---|---|---|
| JP | 2002115573 | 4/2002 |
| JP | 2005329816 | 12/2005 |
| JP | 2007230476 | 9/2007 |
| JP | 2009202794 | 9/2009 |
| WO | 2012095636 A2 | 7/2012 |
| WO | 2013046885 A1 | 4/2013 |

OTHER PUBLICATIONS

Second Office Action issued connection with Chinese Application No. 201480004716.7, dated Jul. 13, 2016.
Third Office Action issued connection with Chinese Application No. 201480004716.7, dated Jan. 17, 2017.
Written Opinion of the International Preliminary Examining Authority, dated Jul. 29, 2015, received connection with International Application No. PCT/GB2014/050089.
International Search Report, dated Mar. 11, 2015, received in connection with corresponding International Application No. PCT/GB2014/050089.
Great Britain Intellectual Property Office Search Report for Great Britain Application No. GB1300496.5, dated Jul. 12, 2013.
International Preliminary Report on Patentability (and annexes thereto), dated Sep. 18, 2015, and received in connection with International Application No. PCT/GB2014/050089.
First Office Action issued by the Japan Patent Office in connection with Japanese Application No. 2015-552142, dated Aug. 8, 2017.

* cited by examiner

CRYOGENIC ENGINE SYSTEM

FIELD OF THE INVENTION

The invention relates to a system comprising a cryogenic engine and a power generation apparatus that produces waste heat (such as a combustion engine, fuel cell etc.) used in a hybrid configuration for the production of power in mobile and static applications.

BACKGROUND OF THE INVENTION

Cryogenic engine systems operate by vaporising a cryogenic liquid (e.g. liquid air, nitrogen, oxygen or liquid natural gas, etc.) in an enclosed space and using the resulting pressurised gas to do work by turning a turbine or pushing a piston. It is a known feature of cryogenic engine systems that elevating the peak cycle temperature will increase their work output. In fact, because of the low cycle starting temperature, very high conversion efficiencies of heat into shaft power may be achieved. However, this is at the cost of energy input to produce the cryogenic working fluids required for the cryogenic engine's operation. This energy input is translated into a financial cost which is critical to take into account when evaluating the business case for the use of a cryogenic engine to convert above ambient temperature heat into shaft power.

Very large quantities of waste heat are generated by industrial and transportation processes globally. For example, an internal combustion (IC) automotive engine may only convert 30-40% of the energy available from its fuel input into shaft power; nearly all of the remaining energy is lost as heat through the radiator, intercooler and exhaust systems. Currently, a number of technologies exist targeting primarily high grade waste heat (>>100'C) like turbo compounding, steam cycles, organic rankine cycles and thermo-electric generation. However, very few technologies target the low grade waste heat and yields are typically quite low (e.g. <5% conversion efficiencies).

Cryogenic engines are potentially attractive for waste heat recovery. They use very low temperature working fluids and so can act as a cold sinks for very high yield heat recovery power cycles even with relatively low grade waste heat sources. Examination of the Carnot Efficiency with a liquid nitrogen working fluid and peak cycle temperature of 100'C (373.15K) demonstrates this.

However, unlike many other waste heat recovery devices, the working fluid for these cryogenic engines is typically used in an open cycle (i.e. it is exhausted after use) as a cryogenic liquid production plant is too expensive, inefficient and bulky for small scale static and mobile (e.g. sub-5MW) applications. Consequently, unlike many other waste heat recovery devices, cryogenic engines have substantial operating costs associated with their consumption of working fluid. Additionally, the cryogenic fluid is depleted during the machine's duty cycle.

In general, the prior art has tended to ignore this issue. For example the purpose of the invention disclosed in U.S. Pat. No. 6,891,850 was to use waste heat solely to provide a pressurised stream of gas for some other use, rather than to generate shaft power. Alternatively, attempts have been made to resolve the issue through elevating the cycle temperature to a very high level to raise the specific energy of the cryogenic working fluid. For example, U.S. Pat. No. 4,354,565 discloses a peak cycle temperature of over 900° C. These two approaches have disadvantages when applied to applications that value power generated; the former does not generate any power from the working fluid and the latter is not relevant to the low grade waste heat rejected by IC engines and fuel cells. Additionally, at these higher temperatures closed cycles with other working fluids become feasible and consequently these systems tend to have a high level of complexity.

U.S. Pat. No. 6,202,782 describes a hybrid propulsion system in which thermal storage is used such that a gas turbine may be operated intermittently to power a Rankin cycle. Heat from exhaust gases is stored in an accumulator to drive a secondary expansion cycle.

U.S. Pat. Nos. 4,226,294, 4,359,118 and 4,354,656 disclose a liquid nitrogen or air based power cycle where the primary source of heat is a high temperature furnace. Heat is recovered from a number of other sources (two in U.S. Pat. No. 4,359,118) but there is no provision of a system that can operate dynamically.

US 2010/0083940 uses a cryogenic fluid (liquid air) to cool inlet air for a combustion engine. Although this approach increases the efficiency of the combustion engine, it does not use the cryogen as a working fluid to produce power.

Many instances of cryogenic engine and heat producing power source coupling disclosed in the prior art involve heat being consumed by the cryogenic engine operating as heat is generated. It is sub-optimal to operate a cryogenic engine in this manner. The prior art does not allow anything useful to be done with the heat given off by the heat producing power source's operation when the cryogenic engine is not running.

Therefore, there exists a need for an economically viable means of using a cryogenic engine to convert above ambient temperature heat from any waste source (e.g. an internal combustion engine, fuel cell or other co-located heat generating process) into additional shaft power.

Another aspect of the use of cryogenic working fluids is their low temperature which means that they can provide cooling to co-located processes. However, there exists a need for a system in which cooling, as well as shaft power from a cryogenic engine, is provided by the working fluid of a cryogenic engine. An approach that extracts maximum benefit from every kg of working fluid consumed by utilising both the cold and the work producing capability is likely to maximise the economic benefit of a cryogenic engine used in this manner. In this regard, there also exists a requirement to improve the overall efficiencies of power generation systems in general and systems incorporating cryogenic engines in particular, and whilst some efficiency gains can be achieved through thermal coupling, still further and separate efficiency and indeed economy gains can be made by mechanically coupling a cryogenic engine with another power generation apparatus. Such efficiencies and advantages are achieved by the present invention which allows the overall system to be operated to the best advantage of each of the cryogenic engine and the separate power generation apparatus whilst also allowing each to be of a reduced size relative to the peak power demand. Each engine can be optimized for power production within the desired band of performance and can be both smaller and more efficient than might otherwise be possible if it alone was to be providing the total power output. Demand is met by intermittent operation of one or other or both engines depending on the power demand and this is in stark contrast with the prior art which tends to use the cryogenic engine at full output all the time.

SUMMARY OF THE INVENTION

In accordance with a first aspect of the present invention, there is provided: a cryogenic engine having a first motive power output member; a power generation apparatus having a second motive power output member; a transmission system operably connected for receiving motive power inputs from one or other or both the first and the second motive power output members; and a transmission output operably connected for receiving motive power from the transmission system.

The above arrangement allows for the selective, individual or combined actuation of one or more of the two means of providing power and will allow the system to selectively operate the engines individually or in combination on an intermittent basis so as to best meet the power demand whilst also operating the engines in a manner that best matches their optimum efficiency and performance capabilities. Such an arrangement is distinguished from the "constant cryogenic" arrangement of the prior art and is particularly beneficial in the "fully dynamic" arrangement as discussed within this patent specification.

Advantageously, the system further includes a controller for controlling the operation of each of the cryogenic engine and the power generation apparatus such as to cause the supply of motive power from one or other or both thereof to said transmission system.

Conveniently, the output members comprise drive shafts.

In a preferred arrangement, the transmission system includes a summing mechanism and wherein the first and second motive power output members are each coupled to said summing mechanism and wherein the transmission system includes a common final output member which is shared between the cryogenic engine and the power generation apparatus, and the cryogenic engine and the power generation apparatus are configured to output power via the common final power output member which may also be provided with a clutch between it and any final power output.

Advantageously, the system further includes first and second driven wheel sets operably connected to said transmission system for receiving motive power therefrom.

Preferably, the system further includes a first clutch between the first drive wheel sets and the transmission.

Advantageously, the system includes a second clutch between the second drive wheel sets and the transmission.

Advantageously, the system further includes separate first and second auxiliary output members operably connected to the transmission system for receiving motive power from one or other of the cryogenic engine or the power generation apparatus, said auxiliary output members also being configured to direct motive power to individual and separate drive wheel sets.

The cryogenic engine and the power generation apparatus may be coupled (e.g. mechanically) with each other so that the output means is shared between the cryogenic engine and the power generation apparatus, and the cryogenic engine and the power generation apparatus are configured to output power selectively via the output means.

The cryogenic engine may comprise:
a first tank for storing a working fluid of the cryogenic engine;
a heat exchange fluid (HEF) tank for storing a heat exchange fluid, wherein the heat exchange fluid is configured to transfer heat to the working fluid of the cryogenic engine; a cryogenic engine block comprising at least one expander for extracting power from the working fluid by expanding the working fluid, and outputting the extracted power via an output means; and a HEF reclaim for retrieving HEF after the HEF has transferred heat to the working fluid.

The cryogenic engine may further comprise:
at least one working fluid pump and/or at least one working fluid injector for transferring working fluid from the first tank to the cryogenic engine block; and
at least one HEF pump for transferring HEF from the HEF tank to the cryogenic engine block.

HEF may be introduced directly into the at least one expander to mix the HEF with the working fluid in the expander to permit the HEF to transfer heat to the working fluid. Alternatively or additionally, the cryogenic engine block may further comprise at least one pre-mixer for mixing HEF with the working fluid before the working fluid is introduced into the at least one expander.

The cryogenic engine may further comprise at least one ancillary heat exchanger for transferring heat to the HEF before the HEF is introduced into the cryogenic engine block.

The cryogenic engine and the power generation system may be coupled with each other to permit transfer of thermal energy between the cryogenic engine and the power generation system. The system may further comprise a first transfer means configured to transfer waste heat expelled by the power generation apparatus to the cryogenic engine system.

A HEF tank of the cryogenic engine is integrated with the power generation apparatus. The first transfer means may be configured to transfer waste heat expelled by the power generation apparatus to the HEF tank. The HEF tank may be configured to store waste heat expelled by the power generation apparatus, and may be insulated and/or comprise a thermal energy storage means, such as a phase change material.

The power generation apparatus may optionally comprise a heat rejection means (e.g. a radiator) for expelling waste heat from the power generation apparatus. The heat rejection means may expel waste heat from the system.

The cryogenic engine and the power generation apparatus can be decoupled from each other to permit expulsion of waste heat from the power generation system whilst the cryogenic engine is not in operation. Alternatively or additionally, the cryogenic engine and the power generation apparatus can be partially decoupled from each other to permit expulsion of waste heat from the power generation system via the heat rejection means whilst the cryogenic engine is in operation.

The cryogenic engine and the power generation apparatus may be coupled with each other such that a working fluid of the cryogenic engine provides cooling to the power generation apparatus.

The cryogenic engine and the power generation apparatus may be coupled with each other such that the working fluid of the cryogenic engine provides cooling to the power generation apparatus intermittently.

Boil-off of the working fluid of the cryogenic engine, for example from the tank and/or pump and/or injector, may provide cooling to the power generation apparatus. Alternatively or additionally, a portion of the working fluid of the cryogenic engine may be set aside specifically to provide cooling to the power generation apparatus. One example of how this cooling may be used is the working fluid from the cryogenic engine may be injected into an intake airflow of the power generation apparatus (e.g. if it is an IC engine) via a control valve or series of control valves. The working fluid of the cryogenic engine may be capable of providing substantially all of the intake airflow of the power generation apparatus. Working fluid from an exhaust of the cryogenic engine may provide cooling to the power generation apparatus.

The cryogenic engine and the power generation apparatus may be coupled with each other to permit the cryogenic engine and the power generation apparatus to output power via the output means independently of each other and in co-operation with each other.

The system may be operable in a first mode, a second mode and a third mode, wherein:
in the first mode, one of the cryogenic engine and the power generation apparatus outputs power via the output means;
in the second mode, one of the cryogenic engine and the power generation apparatus output power via the output means; and
in the third mode, both of the cryogenic engine and the power generation apparatus output power via the output means.

One of the cryogenic engine and the power generation apparatus may output power via the output means in the first mode, and the other of the cryogenic engine and the power generation apparatus may output power via the output in the second mode.

The system may be configured to operate in the first mode below a first predetermined threshold and in the second mode above the first predetermined system power output threshold.

The system may be configured to operate in the second mode below a second predetermined threshold and in the third mode above the second predetermined system power output threshold.

The second predetermined threshold may correspond to a higher system power output than the first predetermined threshold.

A working fluid of the cryogenic engine may comprise at least one of liquid nitrogen, liquid air, liquefied natural gas, hydrogen, carbon dioxide, oxygen, argon, compressed air or compressed natural gas.

The power generation apparatus may comprise at least one of an internal combustion (IC) engine, external combustion engine, fuel cell, battery or nuclear apparatus that produces waste heat as a by-product of power generation.

There is also provided a vehicle driven by a system according to the invention. There is also provided a static power unit driven by a system according to the invention.

BRIEF DESCRIPTION OF THE DRAWINGS

The invention will now be described, by way of example only, with reference to the accompanying drawings, in which.

In the figures, like features are denoted by like reference numerals.

DETAILED DESCRIPTION OF THE DRAWINGS

Figure 1:
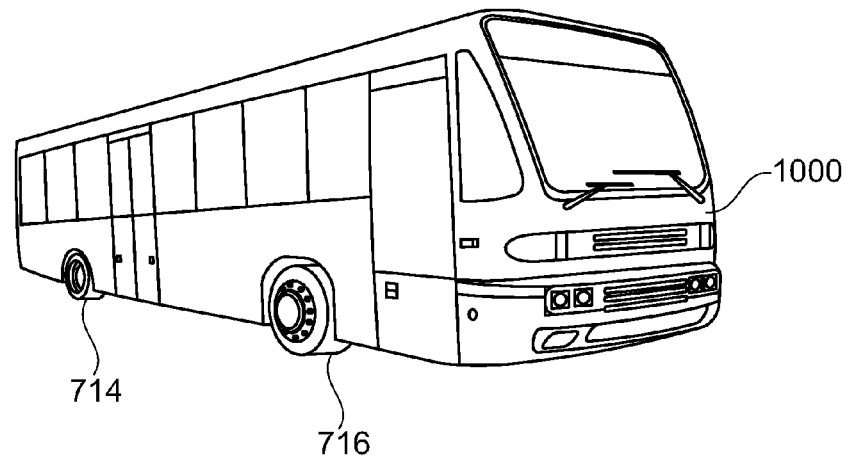
FIG. 1 illustrates a vehicle in the form of, for example, a bus in which the system of the present invention may be provided.
Figure 2:
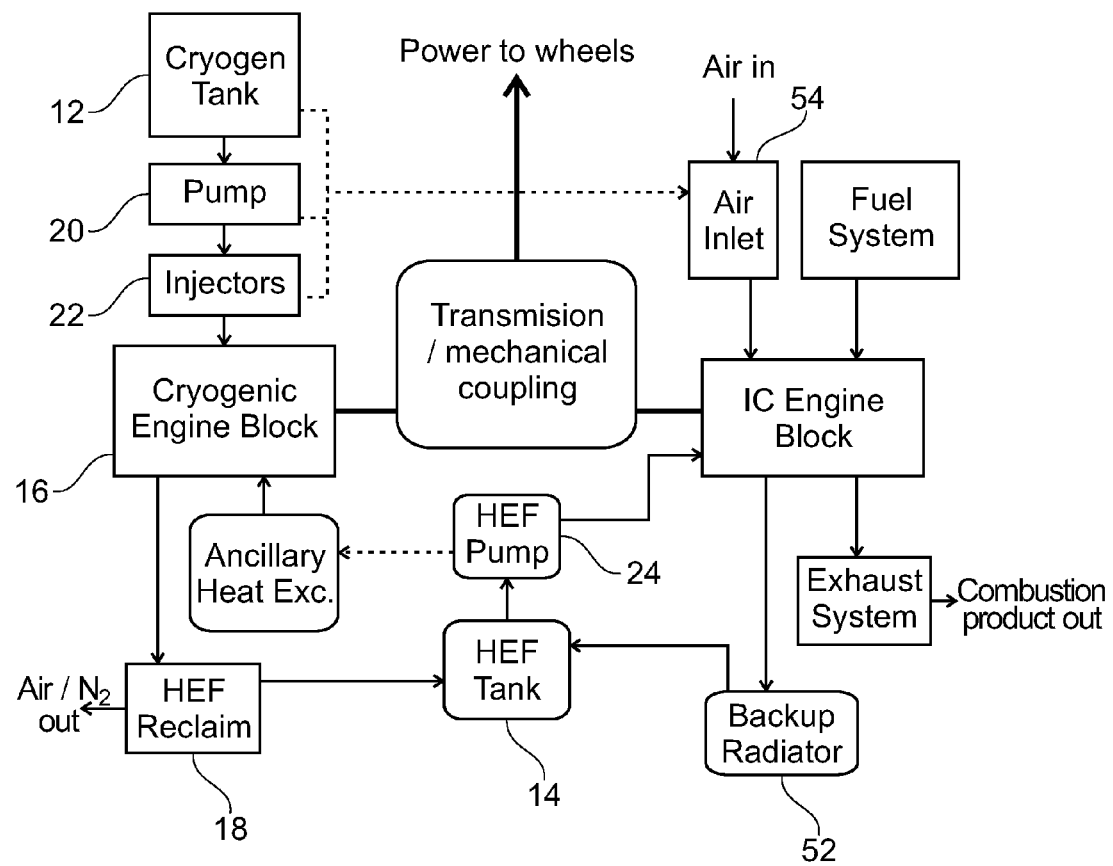
FIG. 2 is a schematic view of a system according to an embodiment of the invention.

The invention is concerned with a coupling between a cryogenic engine and a power generation apparatus. An example embodiment of a system 100 comprising a cryogenic engine 10 and an internal combustion (IC) engine 50 coupling is shown in FIG. 2. However, any other power generation apparatus, such as a fuel cell apparatus, could be used in place of an IC engine. The cryogenic engine 10 and the power generation apparatus 50 (an IC engine in FIG. 1) are coupled with each other to permit the cryogenic engine and the power generation apparatus to work co-operatively with each other.

The system is configured to output power via an output means 80, such as a drive shaft, electric transmission, hydraulic system or other means of power transmission. The output means is configured to drive any suitable mechanism. For example, the system of the present invention can be used to drive a vehicle in a hybrid-like manner, as described in detail below.

The cryogenic engine 10 and the power generation apparatus 50 are coupled (e.g. mechanically) with each other so that the output means 80 is shared between the cryogenic engine 10 and the power generation apparatus 50, and the cryogenic engine 10 and the power generation apparatus 50 are configured to individually or in combination output power via the output means 80.

The cryogenic engine 10 in the embodiment shown in FIG. 2 comprises a first tank 12 for storing a working fluid of the cryogenic engine, a heat exchange fluid (HEF) tank 14 for storing a heat exchange fluid, a cryogenic engine block 16 comprising at least one expander for extracting power from the working fluid by mixing the working fluid with the heat exchange fluid to expand the working fluid, and outputting the extracted power via the output means 80, and a HEF reclaim 18 for retrieving HEF after the HEF has been mixed with the working fluid within the at least one expander and expelled by the at least one expander in the cryogenic engine block 16. The cryogenic engine 10 further comprises a working fluid pump 20, a working fluid injector 22 for transferring working fluid from the first tank 12 to the cryogenic engine block 16, and a HEF pump 24 for transferring HEF from the HEF tank 14 to the cryogenic engine block 16.

Although direct mixing between the HEF and the working fluid in the expander is specifically described above, it will be understood that other heat transfer means (direct or indirect) could equally be used, such as mixing the HEF with the working fluid in one or more pre-mixers or using a heat exchanger, before the working fluid is introduced into the expander. Alternatively, heat transfer may take place between the working fluid of a cryogenic engine and any heat-producing system, such as a refrigeration system or fuel cell for example, or any fluid within such a heat-producing system.

In the system shown in FIG. 2, both engines 10, 50 use a single warmant/coolant heat exchange fluid (HEF) which is accessed independently from a single storage tank 14 via a pump or pumps. Warm HEF flows out from the IC engine 50, optionally via a back-up radiator 52 to the HEF tank. Before delivery to the cryogenic engine block 16, the HEF from the HEF tank 14 may be additionally heated by ancillary heat exchangers 26 providing heat from such systems as an air charge-cooler, oil cooler, braking system, exhaust gas recirculation (EGR) or exhaust either directly or indirectly via additional closed loop power cycles. In some embodiments, it is desirable to have a direct return to the HEF tank 14 for these ancillary heat exchanger(s) 26 to increase control. Working fluid interaction is shown in FIG. 1 with feeds from an exhaust 28, cryogen tank 12, pump 20 and injectors 22 of the cryogenic engine 10 delivering working fluid to an air inlet system 54 of the IC engine 50 for the purpose of cooling and/or turbocharging.

The cryogenic engine 10 and the power generation apparatus 50 are connected mechanically such that power can be provided to the output means (e.g. driveshaft) 80 by either the cryogenic engine 10 or the power generation apparatus 80 operating individually or by both units operating together. This can be realised under the following arrangements, which are provided by way of example only. The skilled person will understand that any other suitable arrangement can equally be used:

Indirect coupling where each unit delivers power to a separate set of driving wheels e.g. the IC engine drives the rear wheels and the cryogenic engine drives the main wheels.

Indirect coupling via an electric or hydraulic medium. In this arrangement each power unit may drive an electric generator or hydraulic pump and the driving wheels are powered by an electric or hydraulic motor. This allows for both a small degree of energy storage within the drive system via a battery or accumulator, and can facilitate regenerative braking.

Direct coupling where both power units are mechanically connected directly to the driveshaft via a series of clutch mechanisms such that they may be disengaged as desired by the control system.

Direct integration of the power units such that they compose a single engine block with connection (mechanical, electrical, hydraulic or otherwise) to the driveshaft.

Figure 3:
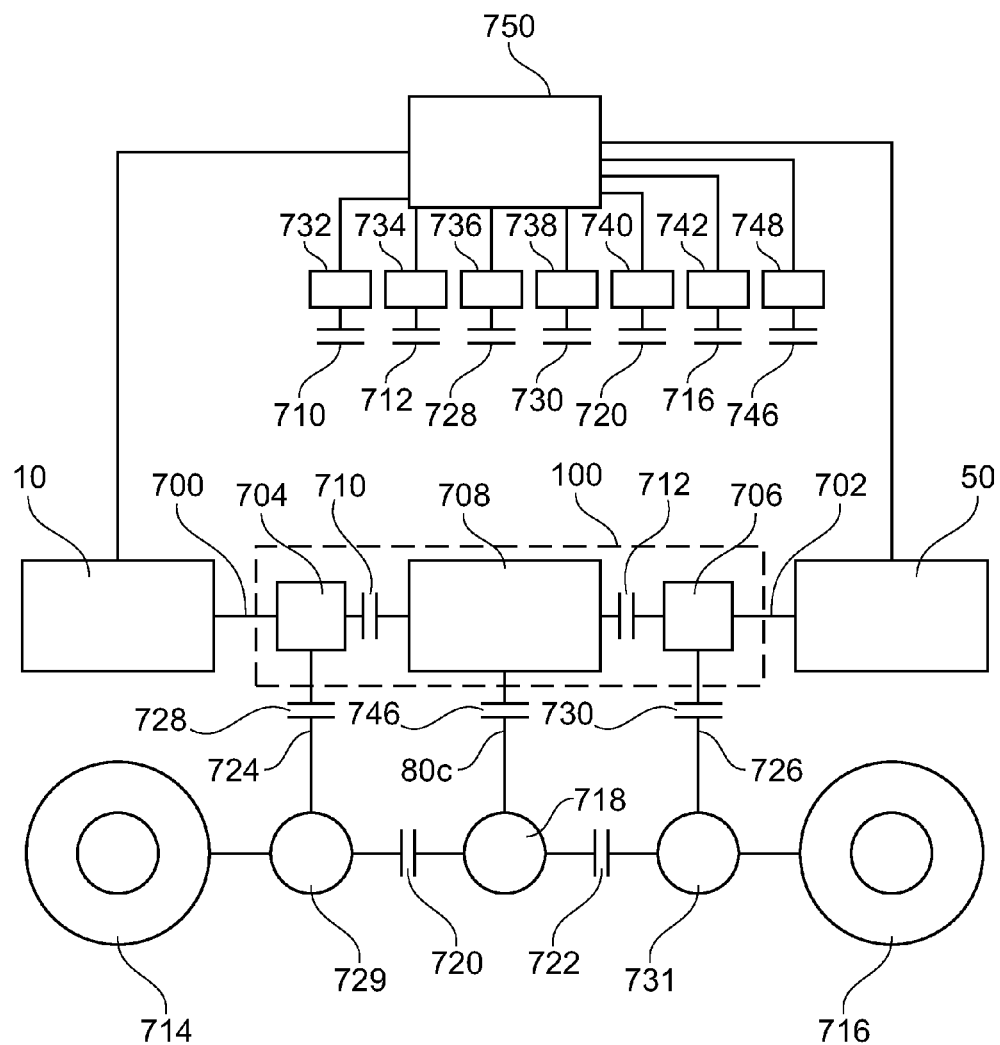
FIG. 3 is a schematic representation of a mechanical coupling system for coupling mechanical in the system of FIG. 2.

FIG. 3 provides a schematic representation of a mechanical coupling arrangement which may be employed as described above. In FIG. 3 the cryogenic engine 10 and the power generation system 50 are each respectively provided with motive power output members in the form of, for example, an output shaft 700, 702 which connect to respective portions 704, 706 of the transmission system shown within dotted lines at 100. The respective outputs 700, 702 of the engines 10, 50 may be coupled together by means of a summing mechanism 708 within transmission system 100 and respective clutches 710, 712 may be provided to facilitate coupling and decoupling of the output shafts from the summing mechanism as and when desired. A common transmission output in the form of, for example, shaft 80c may be provided from the summing mechanism 708 and connected to one or other or both of first and second driven wheel sets 714, 716 by means of a splitting mechanism 718 and further clutching arrangements 720 and 722 positioned between the splitting mechanism 718 and their respective wheel sets 714, 716. Optional or alternatively provided first and second auxiliary output members 724 and 726 may be provided to couple their respective engine 10 and power generation apparatus 50 to respective wheel sets 714, 716. Further clutches 728, 730 may be provided to allow for the selective coupling and de-coupling of these output members. Respective second and third summing mechanisms 729, 731 are provided to receive power from splitter 718 or respective first or second auxiliary output members 724, 726 and for passing motive power to their respective wheel pair sets 714, 716. Each clutch is provided with an actuation mechanism shown schematically at 732, 734, 736, 738, 740, 742 and each is operably connected to a controller 750 which is operable to cause the opening or closing of the clutches as and when desired.

The above arrangement may be operated in a number of ways depending on the operation of the engine 10 and the power generation apparatus 50. Output from both may be taken by the summing mechanism 708 and transmitted to splitter 718 before being provided to both sets of wheel pairs 714, 716 by engaging both clutches 720 and 722 or to either one of the wheel pairs by selective de-coupling of one or other of clutches 720, 722. Alternatively, output from one or other of the cryogenic engine 10 or power generation apparatus 50 may be passed to splitter 718 and transmitted to one or other or both of the wheel pair sets 714, 716 by operation of the clutches as described previously. In an alternative mode of operation the output from one or other or both of the cryogenic engine 10 and power generation device 50 may be channeled more directly and separately to one or other of the wheel set pairs 714, 716. To do this, clutches 710 and 712 are disengaged by the controller 750 such as to eliminate summing mechanism 708 from the transmission path and one or other or both of the clutches 724 and/or 726 on the auxiliary output members 724, 726 are engaged by the controller 750. Depending on the actuation or otherwise of clutches 720 and/or 722, power may be transmitted to individual wheel set pairs 714 or 716 by one or other of the cryogenic engine 10 or power generation mechanism 50. For example, if clutch 720 is disengaged then power from the cryogenic engine 10 will be directed solely to the first wheel set pair 714 but if clutches 720 and 722 are both engaged then power from engine 10 may be transmitted to both of the first and second wheel set pairs 714 and 716. In this latter arrangement, it is possible to de-couple the power generation apparatus 50 by de-coupling clutch 730. The skilled reader will appreciate the opposite arrangement may also be possible in which the power generation apparatus 50 may be used to drive one or more of the wheel set pairs 714, 716 by coupling or de-coupling the respective clutches. For example, the power generation apparatus may be used to drive the first wheel set pair 714 by activating clutches 720, 722 and 730, deactivating each of clutches 710, 712 and 728. Such an arrangement would also cause the turning of the summing mechanism 708 but this can be eliminated by the provision of a further, optional, clutch 746 in the common output 80c and associated actuator 748 connected to the controller 750 for actuation thereby. Alternatively, in some modes of operation it is possible to eliminate the summing mechanism 708 completely and have the two engines 10, 50 provide power through their own output shafts 700, 702 to separate wheels pairs 714, 716 via output shafts 724, 726 which are then no longer "auxiliary".

The capability of cryogenic engines to convert even low grade sources of heat into power means that a very wide range of potential heat sources are available. For example, a cryogenic engine may usefully recover heat from an IC engine's oil heat exchanger, charge air pre-cooler, exhaust (post catalytic converter), exhaust gas recirculation system, engine coolant system or even braking through use of technologies like electric or hydraulic retarders, etc. Prior art attempts have assumed that all heat rejected from the co-located process (e.g. IC engine) should be converted into shaft power by the cryogenic engine. However, if the cost of cryogenic working fluid is too high, this operating regime is sub-optimal. Alternatively there may be situations where the cryogenic working fluid is depleted yet the user still requires the co-located process to function. As a result, one embodiment of the current invention includes the use of an optional conventional heat rejection apparatus (e.g. a radiator) to enable the heat/power generating process to function when the cryogenic working fluid of the cryogenic engine is depleted. This has the benefit of allowing the co-located cryogenic engine to capture and convert only the portion of heat rejected from the heat generating power generation apparatus that is optimal for the particular application.

The integration of a heat exchange fluid system of a cryogenic engine 10 with a coolant system of an IC engine 80 is described in the following for two embodiments in which a single fluid or mixture (such as water-antifreeze) is used. An alternative is to use multiple heat exchange fluids and coolants with liquid/liquid heat exchangers as the interface point between them. In the single heat exchange fluid and coolant embodiment, both the 'dual pump' and 'common rail' systems described below allow for a number of operating regimes likely to be encountered in the running of a cryogenic-IC engine hybrid system that does not operate at a fixed power ratio. In exemplary embodiments, an insulated heat exchange fluid (HEF) tank to store thermal energy expelled from the IC engine system for use in the cryogenic engine system is used. The HEF tank is split such that a smaller portion (e.g. the right hand side) is used to store higher temperature HEF. This allows for the inevitable cooling of the main body of HEF as it is used for cryogen engine operation only, whilst retaining some hot HEF to circulate through the radiator for periodic defrost, or for pre-warming of the IC engine block and oil prior to start-up. The two sides of the HEF tank are connected with an overflow so that when the hot side is full HEF spills into the cooler side.

In an alternative embodiment, the HEF tank is a single tank, instead of a split tank as described above.

Figure 4:
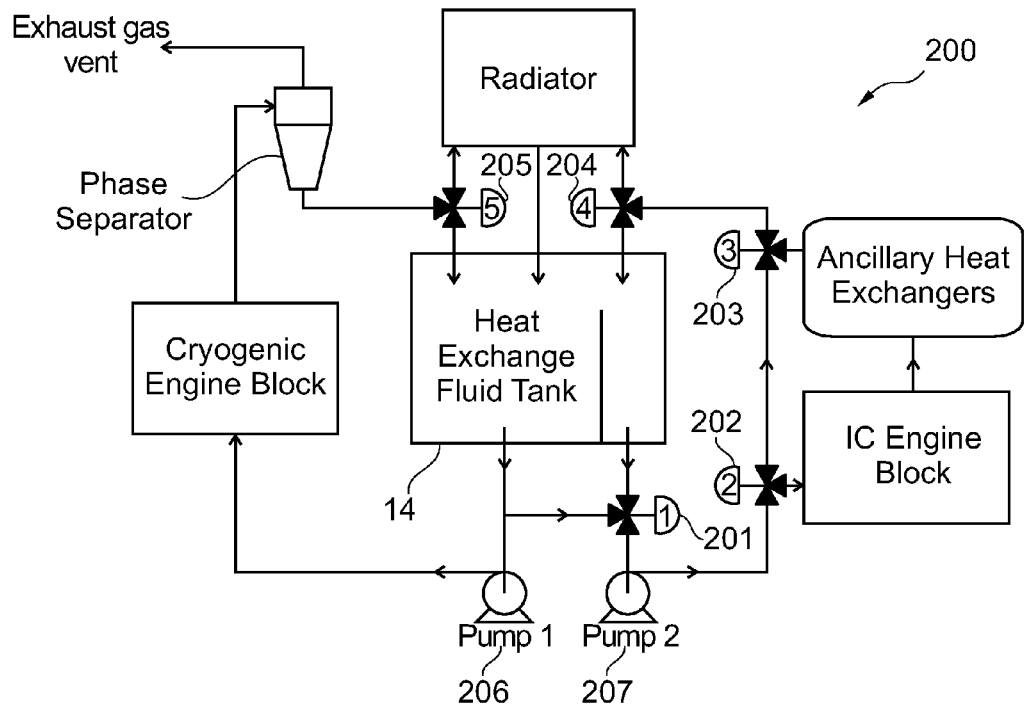
FIG. 4 is a schematic view of a first thermal coupling of a system according to an embodiment of the invention.

FIG. 4 shows a dual pump system 200 comprising a separate pump to provide HEF to each of the cryogenic engine 10 and the power generation apparatus 50, in this case an IC engine. A first pump 206 delivers HEF from a cooler portion of the HEF tank 14 to the cryogenic engine 10 during operation. On leaving the cryogenic engine, the HEF is separated from exhaust gases and flows to a three way valve 205. If the HEF is at above ambient temperature, the HEF is returned to a cooler side of the HEF tank 14 directly. If the HEF is at below ambient temperature, it is returned to the cooler side of the HEF tank 14 via a radiator which provides some portion of the energy to re-heat the HEF from ambient air. A pump 207 delivers HEF to the IC engine block 16 and ancillary heat exchangers (such as charge air and oil coolers). A Valve 201 is used to provide HEF from a hot side of the HEF tank 14 while its temperature is below a pre-set value (near 100° C.) or from the cooler side otherwise. Another Valve 204 is used to return HEF to the HEF tank 14 through the radiator if additional cooling is required (for example with IC only operation) or directly otherwise. HEF from a hot side of the HEF tank 14 is directed through the engine block 16 and ancillary heat exchangers for pre-warming, or directly to the radiator for defrost of the radiator during ambient operation of the cryogenic engine by appropriate operation of valves 201-204.

Figure 5:
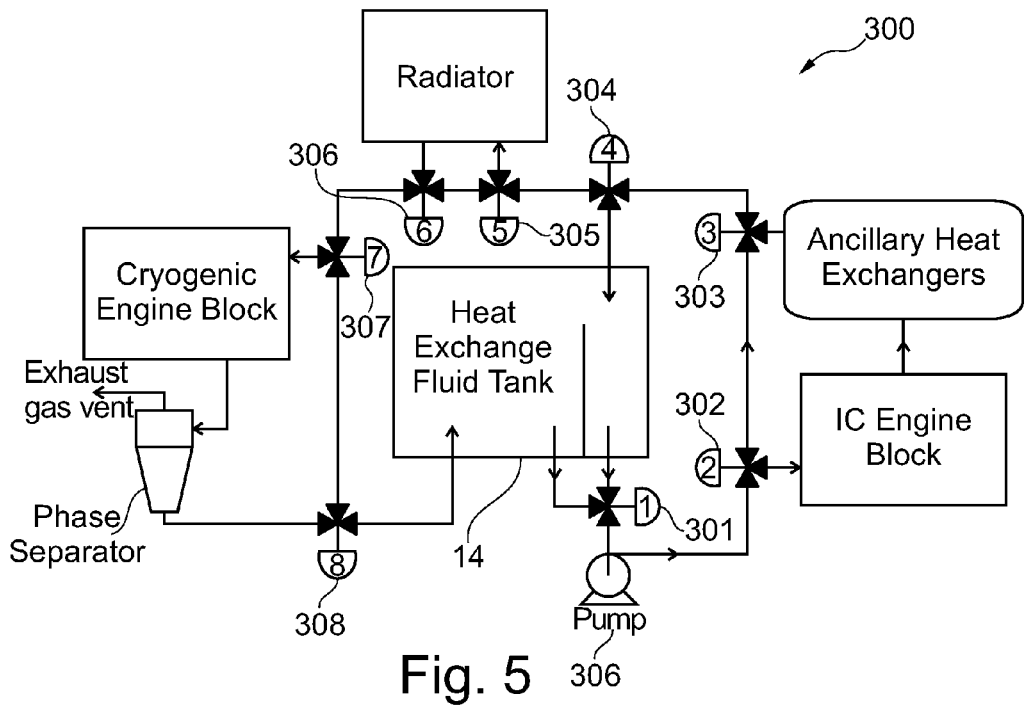
FIG. 5 is a schematic view of a second thermal coupling of a system according to an embodiment of the invention.

Another system 300 according to an embodiment of the invention is shown in FIG. 5. Again, the system comprises a cryogenic engine 10 and a power generation apparatus 50, in this case an IC engine. Like FIG. 4, a pump 306 delivers HEF to the IC engine block 16 and ancillary heat exchangers (such as charge air and oil coolers). There is a common rail to deliver HEF to any subsystem (e.g. IC engine, ancillary heat exchangers, radiator, cryogenic engine) in the hybrid system 300, and this is achieved through appropriate control of valves 301-308. Therefore, the system of integration shown in FIG. 5 provides the same functionality as FIG. 4 whilst requiring the use of the single pump 306 only.

Figure 6:
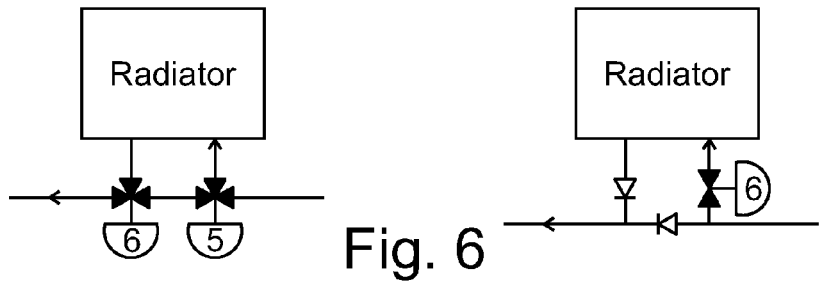
FIG. 6 is a schematic view of alternative valving arrangements according to an embodiment of the invention.

In the above embodiments, valve operation is directed automatically by the control system. Actuation may be achieved by any means, for example by solenoid or pneumatic system. Where it is beneficial, any of the three-way valves shown in these systems may be replaced by a combination of two-way valves and check valves as exemplified for a radiator subsystem in a common rail configuration as shown in FIG. 6.

Another feature of the present invention involves the use of cryogenic working fluids and their low temperature to provide cooling to co-located processes, such as an IC engine, as well as shaft power through their use in a cryogenic engine. Cooling may be obtained from the cryogenic working fluid through methods such as:

Use of boil-off from various points on the cryogenic engine system

Sacrifice of a portion of the working fluid purely for its cooling capabilities

Operating the cryogenic engine in such a way as to deliver cooling at the expense of shaft power (e.g. by allowing lower temperatures at the end of the expansion process)

The cooling can then be transferred to other parts of the system through direct contact with the working fluid, indirect heat exchange means or through use of a further intermediary fluid.

This cooling can be used for co-located processes that require cold, like refrigeration and air conditioning. Alternatively, the cooling may be used to enhance the efficiency of a heat producing process, such as a power generation apparatus such as an IC engine or a fuel cell. For example, it is possible to cool charge air for an IC engine or lower the bottom temperature on a co-located organic rankine cycle or thermo-electric generator. The skilled person will understand that other suitable heat producing processes could equally be used.

The use of liquid air (or any other suitable cryogen) to power the cryogenic engine allows for a compact direct cooling system to be integrated with an IC engine air intake. It is well known that lowering of the inlet temperature can be beneficial for turbo and supercharged engines, reducing compression work, likelihood of engine knock and increasing the fuel charge that can be combusted from increased air density.

Figure 7:
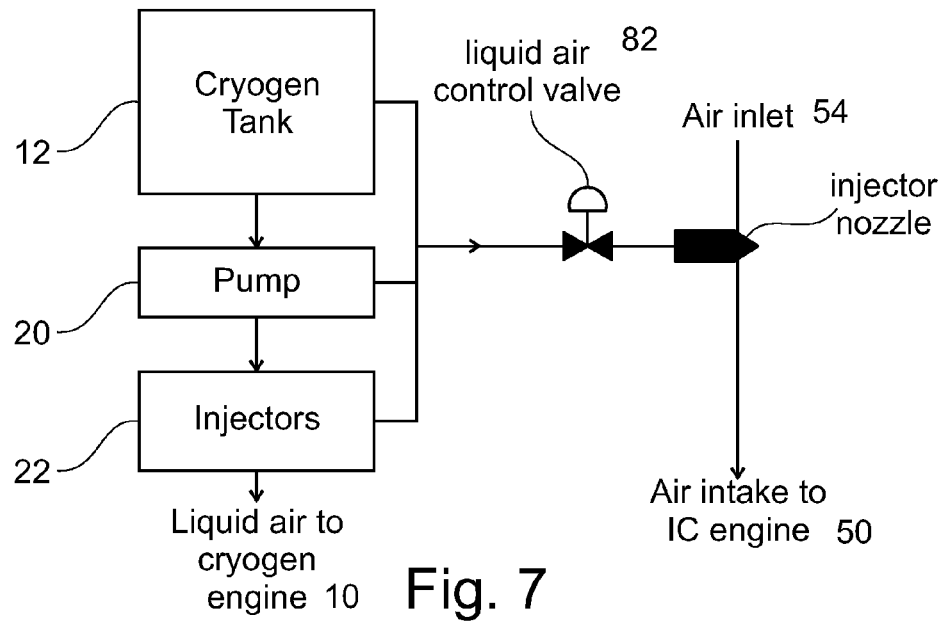
FIG. 7 is a schematic view of a first cooling arrangement according to an embodiment of the invention.

As shown in FIG. 7, cryogenic working fluid, preferably liquid air in this embodiment, is taken from a cryogen tank 12, pump 20 or injectors 22 of a cryogenic engine 10 and injected into an intake airflow 54 of an IC engine 50 via a control valve 82 or series of control valves. This cryogen feed may be of a very low mass flow associated with boil off losses from the aforementioned subsystems, or deliberately purged cryogen at much higher instantaneous flow rates based either on the cool-down requirements of the cryogenic engine 10 or the power 'boost' requirements of the IC engine 50. The cryogenic air flow is likely to be some mixture of liquid and gaseous phase air, due to heat transfer to pipework, but may equally be composed of fully liquid or fully (cold) gaseous air. On mixing with the IC engine intake air flow 54 the cryogen vaporises and warms, cooling the ambient air stream and reducing the average intake air temperature. If a turbocharger is included in the IC engine 50, the cooling may take place before or after the turbo compression stage, or optionally through the use of two injectors either side of the turbo-charger to cool at both stages. The arrangement of the invention has the benefits of being capable of a) intermittent use at selected parts of the engine maps and, b) addition of a small mass of liquid air relative to ambient air intake. The result is a much lower usage of the liquid air compared to the flow rates required to supply full inlet air mass, and this is highly relevant to limiting the amount of liquid air, or any other suitable cryogenic working fluid, that needs to be stored on board a vehicle, for example. Limited use may be made of such an arrangement with nitrogen as cryogenic fluid, with the benefit of reducing NOx production in the combustion engine.

Although the embodiment of FIG. 7 has been described with the use of liquid air as the cryogenic working fluid, the cryogenic working fluid may be any cryogen (e.g. liquid air, hydrogen, nitrogen, oxygen, carbon dioxide, liquefied natural gas, etc.).

Figure 8:
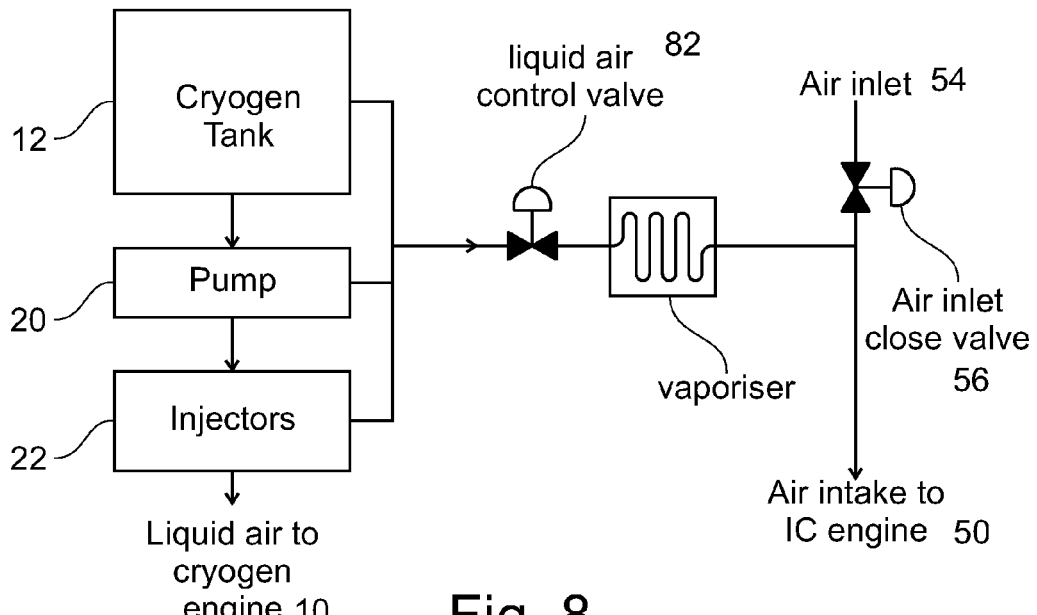
FIG. 8 is a schematic view of a second cooling arrangement according to an embodiment of the invention.

Another arrangement, shown in FIG. 8, provides for the use of liquid air taken from cryogenic engine 10 feed subsystems (e.g. tank 12, pump 20 or injectors 22) to provide 100% of the working fluid to the IC engine 50 for limited 'boost' periods. The liquid or multiphase air is allowed to flow at pressure through an ambient or waste heat exchanger via a control valve 82. Here it is fully vaporised and delivered to the IC engine 50 intake 54 as a cool gas at elevated pressures. A second valve 56 in the air inlet 54 is closed simultaneously such that pressurised gas is forced into the IC engine 50 and not lost to the atmosphere. This control valve may optionally be replaced with a check valve, or any other suitable valve or valve arrangement.

Figure 9:
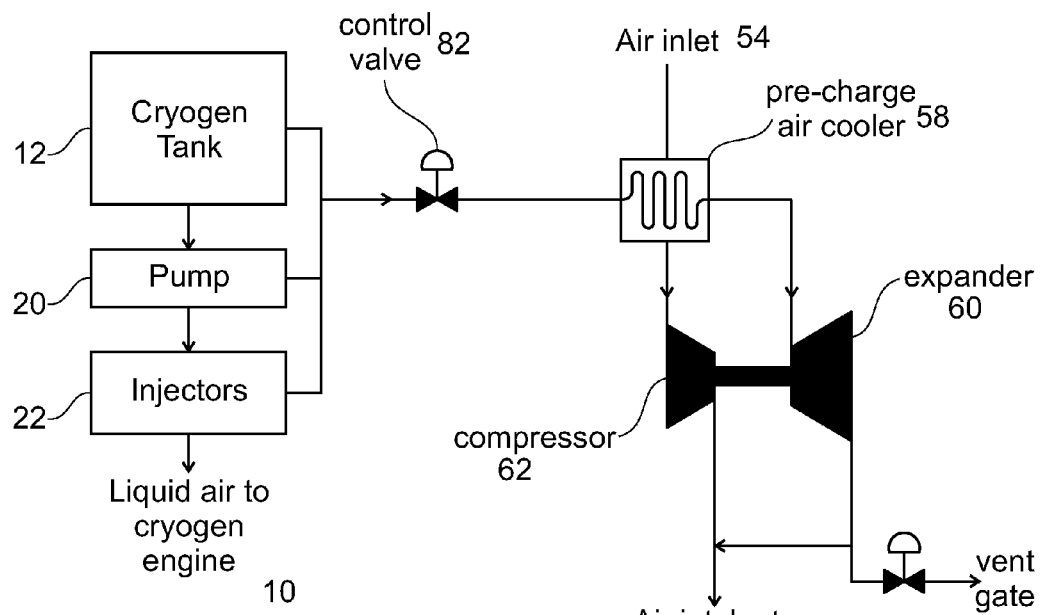
FIG. 9 is a schematic view of a third cooling arrangement with turbocharging according to an embodiment of the invention.
Figure 10:
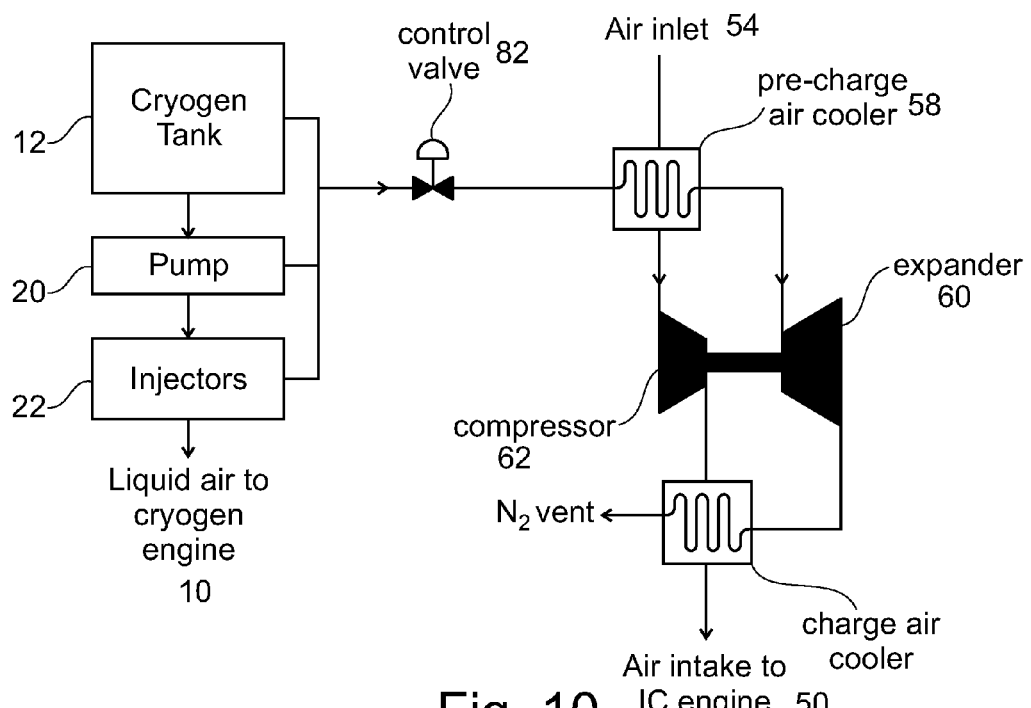
FIG. 10 is a schematic view of a fourth cooling arrangement with turbocharging according to an embodiment of the invention.

Both air intake pre-cooling and turbocharging can be achieved via the systems shown in FIG. 9 for liquid air and FIG. 10 for liquid nitrogen. As shown in FIG. 9, cryogenic working fluid is taken from the feed subsystems (tank 12, pump 20, injectors 22) of the cryogenic engine 10, either continuously at low levels or intermittently at desired times, via a control valve 82 or valves. Liquid or multiphase cryogen passes through a pre-charge air cooler 58 where it is vaporised and warmed, cooling the IC engine air inlet flow 54 prior to the compression stage of the turbocharger. As a near ambient temperature gas, it then flows through an expander 60, producing work to drive a turbo-compressor 62. This expander may be of any appropriate type, e.g. axial, centrifugal or reciprocating, and coupled to the turbo-compressor 62 via a mechanical coupling or other means.

If liquid air is used as the cryogenic working fluid then this may then be added to the charged air prior to intake into the IC engine 50 to provide further cooling. Optionally this exhaust liquid air can be vented to the atmosphere. Although liquid air is specifically referred to, the cryogenic working fluid may be any cryogen (e.g. liquid air, hydrogen, nitrogen, oxygen, carbon dioxide, liquefied natural gas, etc.).

In scenarios where it is not preferred to introduce cryogenic working fluid into an air intake of an IC engine (e.g. if liquid nitrogen is used as the cryogenic 'fuel'), further cooling to the charge air takes place via another heat exchanger, such as a 'charge air cooler' as shown in FIG. 10. In this embodiment, like in FIG. 9, cryogenic working fluid is taken from the feed subsystems (tank 12, pump 20, injectors 22) of the cryogenic engine 10, either continuously at low levels or intermittently at desired times, via a control valve 82 or valves. Liquid or multiphase cryogen passes through a pre-charge air cooler 58 where it is vaporised and warmed, cooling the IC engine air inlet flow 54 prior to the compression stage of the turbocharger. As a near ambient temperature gas, it then flows through an expander 60, producing work to drive a turbo-compressor 62. This expander may be of any appropriate type, e.g. axial, centrifugal or reciprocating, and coupled to the turbo-compressor 62 via a mechanical coupling or other means. Exhaust gas is then vented to the atmosphere. Optionally some cryogen may be introduced to the air intake of a combustion engine 50 to reduce NOx production from combustion.

The combined pre-cooling and turbocharging concepts described herein can be used in addition to turbocharging systems found on the many IC engines. The turbo-compressor stages may be arranged in series or in parallel (with appropriate valves) in the air inlet. Alternatively the expanders in the cryogenic and IC exhaust flows may be coupled to a single compressor stage via mechanical or other means. For a mechanical coupling it may be advantageous to fit a clutch mechanism (such as an overrunning clutch) such that the IC engine exhaust expander stage is continually coupled to the compressor, but the cryoexpander stage is disengaged except when in use. It will be understood by people skilled in the art that these arrangements particularly those shown in FIG. 10 will be appropriate for use with any cryogenic working fluid (e.g. liquid natural gas, hydrogen, oxygen, carbon dioxide or any other suitable cryogenic working fluid) as they exploit both the cooling and expansion properties of the cryogens.

Alternatively, or additionally to the above described systems, further turbocharging may be gained from an exhaust flow of a cryogenic engine. This may be achieved by under-expanding vaporized cryogenic working fluid in a cryogenic engine cylinder such that exits at above ambient pressure. This can be arranged with other turbocharging compressor and expander stages as described above. Under the system setup shown in FIG. 9, warm above ambient pressure exhaust gas from a cryogenic engine is sent to an expander 60 and expanded producing work to drive or assist in driving a turbo-compressor 62 increasing the pressure of the IC engine air intake 50. Post-expansion, this exhaust gas can be used to cool the charge air via a heat exchanger prior to being vented to the atmosphere. Optionally, if the cryogenic working fluid is liquid air then part of this may be ducted to the air inlet where the low level of entrained moisture may be advantageous to the expansion process in the IC engine cylinder. As an alternative, intake air charging may be achieved by directing the cool air at elevated pressure directly from the cryogenic engine exhaust to the IC engine intake. In general the cryogen may be any cryogen (e.g. liquid air, hydrogen, nitrogen, oxygen, carbon dioxide, liquefied natural gas, etc.).

Figure 11:
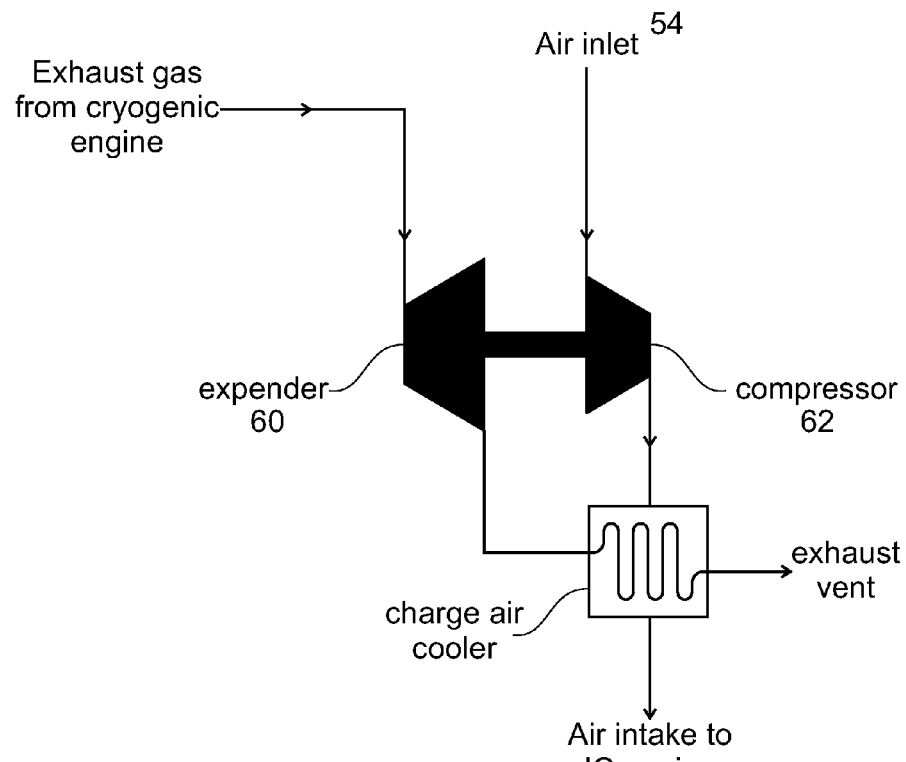
FIG. 11 is a schematic view of a fifth cooling arrangement with turbocharging according to an embodiment of the invention.

In some embodiments, cryogenic working fluids additionally form the fuel source for the power generation apparatus, for example with liquefied natural gas or hydrogen combusted in an IC engine or hydrogen used in a fuel cell. The hydrogen or LNG could provide power from expansion in the cryogen engine followed by power from combustion/chemical reaction in the power generating apparatus. In this case the embodiments described with reference to FIGS. 7, 9 and 11 may be used, such that the working fluid is introduced to the air intake of the power generation apparatus.

A further aim of the present invention is to provide an operating regime which maximises the efficiency and simplicity of the invention. As an example of using a cryogenic engine and thermal store to allow operation of a heat producing power source at its most efficient point, the cryogenic engine may be paired with an IC engine. Typically an IC engine operates less efficiently at low or very high loads. Hence, an example operating regime according to the present invention is:

the cryogenic engine provides motive power when low power is required—benefiting from good low speed torque and removing an inefficient part of the combustion engine duty cycle;

above a certain 'lower' power threshold the combustion engine provides full motive power—within its efficient operating range;

above a certain 'higher' power threshold both power units work in parallel to provide motive power, removing the necessity to size the combustion engine for maximum power requirement.

There are several advantages to this approach. Fuel consumption is reduced directly through use of the cryogenic engine to convert wasted heat into shaft power. Fuel consumption is also reduced through the IC engine running more often, and ideally as often as possible, at its most efficient point(s). Moreover, the IC engine may be downsized because it does not have to supply the entire peak power requirements, increasing the likelihood of it operating at an efficient point and reducing capital cost. One unique benefit of using a cryogenic engine (rather than other heat recovery means) in this scenario is the very high yield available, thus it can be used to provide power across a broader range of operating scenarios than, for example, an organic rankine cycle. The result is a more significant fuel saving and engine downsizing benefit. It is also possible with some hybridisation arrangement to limit the IC engine to a small range of operating conditions—in an extreme case, single speed operation, thereby providing increased efficiency. Prior art systems use turbine expansion and high grade heat, whereas the present invention relates to a cryogenic open secondary cycle.

The high yields of cryogenic engine systems also enable short periods of zero emission operation. Practically, it may be possible to convert about half of the heat rejected from an IC engine into shaft power. This is sufficient power for an embodiment where the cryogenic engine system operates as "prime-mover" for the vehicle or other process with which it is integrated, for limited periods. The first limitation on the length of time this can take place is the size of the thermal store which can be mitigated by an ambient heat exchanger, the second limitation is the amount of cryogenic working fluid stored on the vehicle or process. Correct sizing of the thermal store, cryogenic working fluid store and optional ambient heat exchanger will enable this type of usage pattern. The period for which the cryogen engine may be used as the prime mover can be extended by use of the back-up IC engine radiator to provide partial ambient re-heat to the warmant/coolant HEF after the thermal store has been thermally depleted. By using a split thermal store, a portion of high temperature fluid can be held in reserve to a) provide a high temperature fluid for radiator defrost and b) allow for warm start to the IC engine.

Cryogenic engines can alternatively be paired with fuel cells to achieve similar benefits to those described above in terms of reduced hydrogen consumption through running the fuel cell at its efficient point and making use of the waste heat. Cryogenic engines can also be coupled with other heat-producing systems, such as refrigeration systems, to make use of any waste heat.

Figure 12:
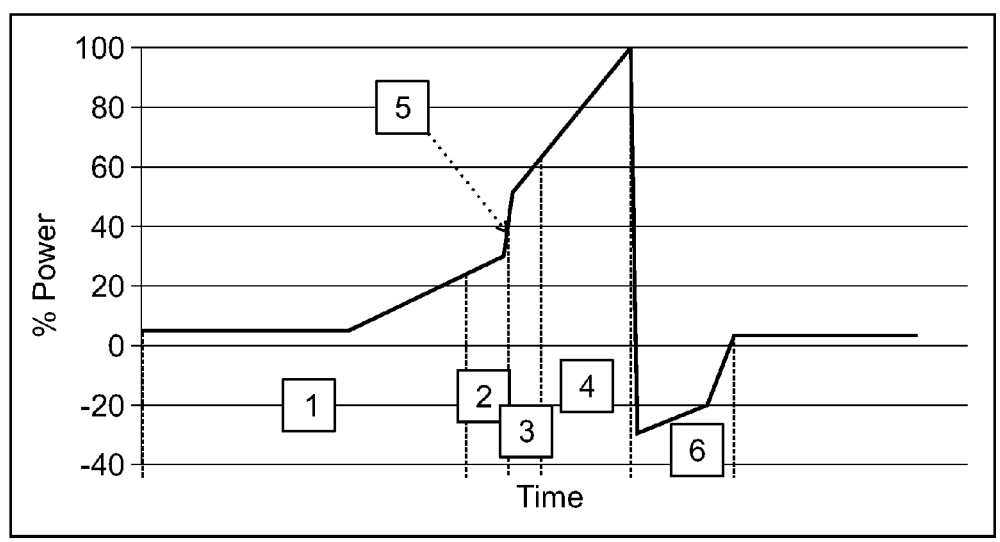
FIG. 12 is a schematic view of a drive cycle involving an acceleration/deceleration event suitable for powering by a system according to the invention.

FIG. 12 shows varying power demands which can be met by a cryogenic IC "hybrid" engine for an example section of a drive cycle involving an acceleration/deceleration event. It will be understood by a person skilled in the art that any other suitable power generation apparatus can be used in place of an IC engine. In an exemplary embodiment, the duty cycle shown in FIG. 10 is driven by a system according to an embodiment of the present invention, as described above.

Segment 1 shows idle, followed by low power operation in which the cryogenic engine is used alone. During the idle section the cryogenic engine is operated at low power output, ideally the power output should be equal only to the minimum requirements of the vehicle in question (e.g. the amount of power required to overcome internal friction, run auxiliary equipment and support hotel loads). The heat exchange fluid can be used to maintain a near constant expansion ratio to ensure that the cryogenic working fluid is efficiently expanded.

Segment 2 the cryogenic engine is shut off and the IC engine takes over, providing the power for the 25-35% range, for example. The start and end point of this range is dictated by the efficient operating point of the IC engine selected for the hybrid.

Segment 3, at 35-60% power, shows where the cryogenic engine is used additionally to the IC engine (i.e. the cryogenic engine and the IC engine work together), up to its design power (of about 25%). The cryogenic engine is used flexibly to provide variable output from the point at which the IC engine is running at maximum efficient power.

Segment 4 the IC engine still provides 35% of the power, but the cryogenic engine is used at a 2 to 3 multiple of its (peak efficiency) design power to provide the maximum rated power for short periods.

Segment 5 the high transient power segment, shows the point at which the pre-cooling and turbocharging methods discussed above may beneficially be used to achieve rapid increases in total shaft power generated.

Segment 6 denotes a deceleration event in which some regenerative braking can be employed for example this may be achieved through use of heat generating retarders or some form of compression based engine braking.

The boundary values of operating ranges given in the above are purely exemplary and may be adjusted to optimise benefits. The exact boundary conditions will depend upon the exact characteristics of the cryogenic and IC engines that are being paired together as well as the duty cycle the equipment is to be used for. It will also be understood that the use of power levels to define the range limits of both the engines is a simplification. In reality the high efficiency range of the IC engine in particular can be better utilised through a two dimensional approach which uses a combination of torque and engine speed to define limits. It will be understood by those skilled in the art that these methods may be used to enhance the flexibility and efficiency of other complimentary power sources such as fuel cells. A particular benefit of the cryogenic-IC engine hybrid-like coupling lies in the ability to achieve a greater multiple of design power density for short periods. In the previous example, the cryogenic engine is sized to produce 25% of the total rated power, but at parts of the drive cycle it may provide up to 65% of rated power. Due to the presence of an incompressible HEF in the cylinder, the expansion ratio may be adjusted within the limits imposed by the engine geometry in addition to changing peak pressures. As such, lower power operation can be maintained at good efficiency by increasing the expansion ratio. Equally, where desirable, it is possible to force more cryogenic fluid into the cylinder for very high power densities, at the expense of lower expansion efficiency. This is a particularly suitable attribute for some applications such as busses, where the drive cycle typically involves long periods of idle loads (which are inefficiently handled by IC engines), and the upper portion of available power output is only used briefly and infrequently. There are however a wide range of other applications and drive/duty cycles for which this hybrid arrangement may be equally well suited.

Reference is now made to Table 1 below which provides a comparison between different power generation arrangements, which include:

A) 'ICE only' which corresponds to a standard diesel powered bus. Hybrid arrangements performance is relative to this configuration.

B) 'Fully dynamic' which is the hybrid arrangement that the applicant is developing.

Compared to the reference case 'ICE only', the IC engine is downsized to ICE Power. This downsized IC engine power output is further restricted between 'ICE power top cap' and 'ICE Power tail cap'. When the power required from the system falls between those caps, the IC engine will provide it on its own (Dearman engine (DE) is off). When the power required is below 'ICE Power tail cap', the DE will provide it on its own (ICE off). When the power required is above 'ICE Power top cap', the IC engine runs at 'ICE Power top cap' and the DE provides the additional power requirements.

C) 'Fixed ratio' which is a semi-dynamic hybrid arrangement. When power is required from the system, whether it is 1 kW or 120 kW, X % will come from the DE and (100−X) % will come from the ICE.

D) 'Constant DE output' which is a non-dynamic hybrid configuration. When power is required from the system, the DE provides a constant X kW output and the IC engine provides the additional requirements.

The outputs from the simulation that can be used to compare different configurations' performance are the following:

'ICE Average Brake specific fuel consumption (bsfc)': is a measure of the fuel efficiency of a reciprocating engine (fuel efficiency decreases with increasing bsfc). Significant reductions in ICE bsfc are an indicator of improved ICE performance.

'Fuel cost' is a crucial parameters to monitor. For the system to make economic sense, the total fuel cost (LN2+Diesel) must fall below the fuel cost for an ICE running solely on diesel. If not, the technology will not have a payback and will thus not be commercially viable.

'Payback': London bus operators bid for 7 year contracts from Transport for London (TfL). A technology which has a payback above 7 years will not be attractive to such operators. While different contract periods may apply to other operators, only technologies with short payback periods will be attractive to end-users (thus commercially viable).

'LN2 needed per liter of diesel saved': gives an indication of how efficiently the hybrid is used to improve overall system efficiency. The lower this ratio the more likely it is that the technology will be commercially viable.

From the comparison table it can be seen that:

'Constant Cryogenic (Dearman Engine or DE) output' hybrid provides a very useful improvement over conventional systems but may not be as economically viable as the present invention given current market prices for diesel and LN2.

20% to 30% diesel savings and a slight ICE efficiency improvement (3% decrease in bsfc) can be achieved. However fuel costs are higher than for conventional engines, meaning the technology will require a long time to pay back and hence it is not a commercially attractive option to end-users.

'Fixed ratio' hybrid provides a significant advantages in itself relative to conventional operation and provides 15% to 20% diesel savings and a 4% decrease in ICE bsfc can be achieved along with reduced total fuel costs (~1 to 2% reduction) when considering a DE which produces 10 to 15% of the power output. This indicates a potentially commercially attractive situation. However for both these cases payback periods remain high (7.4 to >17 years) which prevents the case from being compelling. Additionally, fuel savings would be limited to a maximum 15% making investment in the technology less attractive (achieving higher fuel reductions would require a higher power output from the DE leading to increased fuel costs). This configuration is at the edge of being attractive but most likely not compelling enough.

'Fully dynamic' hybrid represents a significant improvement over conventional diesel engines and alternative hybrid options and would be commercially attractive with current fuel prices.

17% to 18% diesel savings, >7% decrease in ICE bsfc, 4% decrease in fuel costs along with payback periods of less than 5 years make a compelling case for the DE fully dynamic hybrid concept. This is further confirmed by the fact that this arrangement uses the least LN2 per liter of diesel saved (ratio~27 compared to >30 for other cases). Additionally, finer tuning on the ICE top and tail power caps is likely to further improve the 'Fully dynamic' hybrid business case.

While some benefits can be achieved in any hybrid configuration (fuel savings and ICE efficiency), only the optimized control strategy is likely to provide an attractive and economically viable case in the current market. It must be added that the comparison is based on current market prices for diesel and LN2. An increase in diesel prices and/or decrease in LN2 prices could increase the attractiveness of 'Fixed ratio' and 'Constant DE output' hybrids. Yet in such conditions the Dearman fully dynamic hybrid would maintain a competitive advantage over these alternatives.

The present invention has been described above in exemplary form with reference to the accompanying drawings which represent embodiments of the invention. It will be understood that many different embodiments of the invention exist, and that these embodiments all fall within the scope of the invention as defined by the following claims.

TABLE 1

| Hybrid configuration | Dearman | | ICE only | Fully dynamic | | | | Fixed Ratio | | | | Constant DE output | |
|---|---|---|---|---|---|---|---|---|---|---|---|---|---|
| ICE Power | | kW | 100% | 83% | 75% | 67% | 92.50% | 87.50% | 82% | 77.50% | 66.25% | 120 kW | 110 kW |
| DE Power | | kW | 0% | 17% | 25% | 93% | 7.50% | 12.50% | 18% | 22.50% | 39.75% | 5 kW | 10 kW |
| Drive cycle outputs | Calculated/Motiob | | | | | | | | | | | | |
| DE LN2 consumption | | kg | — | 7.70 | 8.58 | 8.28 | 7.42 | 11.13 | 14.84 | 18.55 | 22.26 | 11.73 | 23.46 |
| ICE Fuel consumption | | kg | 1.75 | 1.46 | 1.44 | 1.44 | 1.49 | 1.41 | 1.32 | 1.23 | 1.14 | 1.42 | 1.19 |
| ICE Average bsfc | | g/kWh | 221.09 | 203.97 | 204.06 | 209.35 | 212.71 | 212.18 | 211.59 | 210.91 | 210.29 | 213.38 | 215.04 |
| Fuel Saving over life | Calculated/Excel | % | | 17% | 18% | 18% | 15% | 20% | 25% | 30% | 35% | 19% | 32% |
| Operating Costs | Calculated/Excel | | | | | | | | | | | | |
| Fuel Cost (Diesel + LN2) per cycle | | £ | £ 2.95 | £ 2.84 | £ 2.86 | £ 2.84 | £ 2.88 | £ 2.92 | £ 2.96 | £ 3.00 | £ 3.04 | £ 2.97 | £ 3.18 |
| Payback | | Years | | 4.8 | 5.8 | 5.3 | 7.4 | 17.5 | −47.2 | −10.0 | −5.4 | −22.8 | −2.1 |
| LN2 needed per liter of diesel | Calculated/Excel | LN2 liters/Diesel liters | | 27.11 | 28.45 | 27.51 | 29.49 | 33.05 | 35.18 | 36.59 | 37.72 | 35.98 | 43.11 |

EMBODIMENTS

Embodiment 1

A system comprising:
a cryogenic engine; and
a power generation apparatus,
wherein the cryogenic engine and the power generation apparatus are coupled with each other to permit the cryogenic engine and the power generation apparatus to work co-operatively with each other.

Embodiment 2

A system according to embodiment 1 wherein the system is configured to output power via an output means.

Embodiment 3

A system according to embodiment 2 wherein the output means comprises at least one drive shaft.

Embodiment 4

A system according to embodiment 2 or embodiment 3 wherein the cryogenic engine and the power generation apparatus are coupled with each other so that the output means is shared between the cryogenic engine and the power generation apparatus, and the cryogenic engine and the power generation apparatus are configured to selectively output power via the output means.

Embodiment 5

A system according to any of embodiments 2 to 4 wherein the cryogenic engine and the power generation apparatus are coupled mechanically with each other so that the output means is shared between the cryogenic engine and the power generation apparatus, and the cryogenic engine and the power generation apparatus are configured to selectively output power via the output means.

Embodiment 6

A system according to any of the preceding embodiments wherein the cryogenic engine comprises:
a first tank for storing a working fluid of the cryogenic engine;
a heat exchange fluid (HEF) tank for storing a heat exchange fluid, wherein the heat exchange fluid is configured to transfer heat to the working fluid of the cryogenic engine;
a cryogenic engine block comprising at least one expander for extracting power from the working fluid by expanding the working fluid, and outputting the extracted power via an output means; and
a HEF reclaim for retrieving HEF after the HEF has transferred heat to the working fluid.

Embodiment 7

A system according to embodiment 6 wherein the cryogenic engine further comprises:
at least one working fluid pump and/or at least one working fluid injector for transferring working fluid from the first tank to the cryogenic engine block; and
at least one HEF pump for transferring HEF from the HEF tank to the cryogenic engine block.

Embodiment 8

A system according to embodiment 6 or embodiment 7 wherein HEF is introduced directly into the at least one expander to mix the HEF with the working fluid in the expander to permit the HEF to transfer heat to the working fluid.

Embodiment 9

A system according to any one of embodiments 6 to 8, wherein the cryogenic engine block further comprises at least one pre-mixer for mixing HEF with the working fluid before the working fluid is introduced into the at least one expander.

Embodiment 10

A system according to any one of embodiments 6 to 9 wherein the cryogenic engine further comprises at least one ancillary heat exchanger for transferring heat to the HEF before the HEF is introduced into the cryogenic engine block.

Embodiment 11

A system according to any of the preceding embodiments wherein the cryogenic engine and the power generation system are coupled with each other to permit transfer of thermal energy between the cryogenic engine and the power generation system.

Embodiment 12

A system according to embodiment 11, further comprising a first transfer means configured to transfer waste heat expelled by the power generation apparatus to the cryogenic engine system.

Embodiment 13

A system according to embodiment 11 or embodiment 12 wherein a HEF tank of the cryogenic engine is integrated with the power generation apparatus.

Embodiment 14

A system according to embodiment 13 wherein the first transfer means is configured to transfer waste heat expelled by the power generation apparatus to the HEF tank.

Embodiment 15

A system according to embodiment 13 or embodiment 14 wherein the HEF tank is configured to store waste heat expelled by the power generation apparatus.

Embodiment 16

A system according to any of embodiments 6 to 15 wherein the HEF tank is insulated and/or comprises a thermal energy storage means, such as a phase change material.

Embodiment 17

A system according to any of embodiments 9 to 16 wherein the power generation apparatus comprises a heat rejection means for expelling waste heat from the power generation apparatus.

Embodiment 18

A system according to embodiment 17, wherein the heat rejection means expels waste heat from the system.

Embodiment 19

A system according to embodiment 17 or embodiment 18 wherein the heat rejection means comprises a radiator.

Embodiment 20

A system according to any one of embodiments 17 to 19 wherein the cryogenic engine and the power generation apparatus can be decoupled from each other to permit expulsion of waste heat from the power generation system whilst the cryogenic engine is not in operation.

Embodiment 21

A system according to any one of embodiments 17 to 20 wherein the cryogenic engine and the power generation apparatus can be partially decoupled from each other to permit expulsion of waste heat from the power generation system via the heat rejection means whilst the cryogenic engine is in operation.

Embodiment 22

A system according to any one of embodiments 11 to 21 wherein the cryogenic engine and the power generation apparatus are coupled with each other such that a working fluid of the cryogenic engine provides cooling to the power generation apparatus.

Embodiment 23

A system according to embodiment 22 wherein the cryogenic engine and the power generation apparatus are coupled with each other such that the working fluid of the cryogenic engine provides cooling to the power generation apparatus intermittently.

Embodiment 24

A system according to embodiment 22 or embodiment 23 wherein a boil off of the working fluid of the cryogenic engine provides cooling to the power generation apparatus.

Embodiment 25

A system according to any of embodiments 22 to 24 wherein a portion of the working fluid of the cryogenic engine is set aside and provides cooling to the power generation apparatus.

Embodiment 26

A system according to any of embodiments 22 to 25 wherein working fluid from a tank and/or pump and/or injector of the cryogenic engine provides cooling to the power generation apparatus.

Embodiment 27

A system according to any of embodiments 22 to 26 wherein working fluid from the cryogenic engine is injected into an intake airflow of the power generation apparatus via a control valve or series of control valves.

Embodiment 28

A system according to embodiment 27 wherein the working fluid of the cryogenic engine is capable of providing substantially all of the intake airflow of the power generation apparatus.

Embodiment 29

A system according to any of embodiments 22 to 28 wherein working fluid from an exhaust of the cryogenic engine provides cooling to the power generation apparatus.

Embodiment 30

A system according to any of embodiments 2 to 29, wherein the cryogenic engine and the power generation apparatus are coupled with each other to permit the cryogenic engine and the power generation apparatus to output power via the output means independently of each other and in co-operation with each other.

Embodiment 31

A system according to any of embodiments 2 to 30 wherein the system is operable in a first mode, a second mode and a third mode, and wherein:
in the first mode, one of the cryogenic engine and the power generation apparatus outputs power via the output means;
in the second mode, one of the cryogenic engine and the power generation apparatus outputs power via the output means; and
in the third mode, both of the cryogenic engine and the power generation apparatus output power via the output means.

Embodiment 32

A system according to embodiment 31 wherein one of the cryogenic engine and the power generation apparatus outputs power via the output means in the first mode, and the other of the cryogenic engine and the power generation apparatus outputs power via the output in the second mode.

Embodiment 33

A system according to embodiment 31 or embodiment 32 wherein the system is configured to operate in the first mode below a first predetermined threshold and in the second mode above the first predetermined system power output threshold.

Embodiment 34

A system according to embodiment 33 wherein the system is configured to operate in the second mode below a second predetermined threshold and in the third mode above the second predetermined system power output threshold.

Embodiment 35

A system according to embodiment 34 wherein the second predetermined threshold corresponds to a higher system power output than the first predetermined threshold.

Embodiment 36

A system according to any of the preceding embodiments wherein a working fluid of the cryogenic engine comprises at least one of liquid nitrogen, liquid air, liquefied natural gas, hydrogen, carbon dioxide, oxygen, argon, compressed air or compressed natural gas.

Embodiment 37

A system according to any of the preceding embodiments wherein the power generation apparatus comprises at least one of an internal combustion (IC) engine or a fuel cell apparatus.

Embodiment 38

A vehicle driven by a system according to any of the preceding embodiments.

Embodiment 39

A static power unit driven by a system according to any of the preceding embodiments.

Embodiment 40

A system substantially as hereinbefore described with reference to FIG. 1.

Embodiment 41

A system substantially as hereinbefore described with reference to FIG. 2.

Embodiment 42

A system substantially as hereinbefore described with reference to FIG. 3.

Embodiment 43

A system substantially as hereinbefore described with reference to FIG. 4.

Embodiment 44

A system substantially as hereinbefore described with reference to FIG. 5.

Embodiment 45

A system substantially as hereinbefore described with reference to FIG. 6.

Embodiment 46

A system substantially as hereinbefore described with reference to FIG. 7.

Embodiment 47

A system substantially as hereinbefore described with reference to FIG. 8.

Embodiment 48

A system substantially as hereinbefore described with reference to FIG. 9.

The invention claimed is:
1. A system comprising:
an independently operable cryogenic engine having a first motive power output member, and which operates by vaporizing a working fluid in the form of cryogenic liquid, and having a first tank for storing said working fluid; at least one working fluid injector for injecting said working fluid from the first tank into the cryogenic engine; at least one expander for extracting power from the working fluid by expanding the working fluid; a heat exchange fluid tank for storing heat exchange fluid; and at least one heat exchange fluid pump for transferring the heat exchange fluid from the heat exchange fluid tank to the cryogenic engine, wherein heat is transferred from the heat exchange fluid to the working fluid to vaporize and expand the working fluid;

an independently operable heat generating power generation apparatus having a second motive power output member;

a first transfer means configured to transfer waste heat expelled by the power generation apparatus to the heat exchange fluid tank;

a transmission system operably connected for receiving motive power inputs from one or other or both the first and the second motive power output members and including a common transmission output operably connected for receiving motive power from the transmission system; and a controller configured to control the operation of each of the cryogenic engine and the power generation apparatus such as to cause a supply of motive power from one or other or both thereof to said transmission system.

2. The system as claimed in claim 1 wherein the transmission system includes a summing mechanism and wherein the first and second motive power output members are each coupled to said summing mechanism and wherein the transmission system includes a common final power output member as the common transmission output which is shared between the cryogenic engine and the power generation apparatus, and the cryogenic engine and the power generation apparatus are configured to output power via the common final power output member.

3. The system as claimed in claim 2 and further including first and second driven wheel sets operably connected to said transmission system for receiving motive power therefrom and including a first clutch between the first driven wheel set and the transmission system.

4. The system as claimed in claim 2 and further including first and second driven wheel sets operably connected to said transmission system for receiving motive power therefrom and including a second clutch between the second driven wheel set and the transmission system.

5. The system as claimed in claim 1 and wherein said transmission system includes separate first and second auxiliary output members operably connected to the transmission system for receiving motive power from one or other of the cryogenic engine or the power generation apparatus, said auxiliary output members also being configured to direct motive power to individual and separate driven wheel sets.

6. The system according to claim 1, wherein the heat exchange fluid tank is insulated and comprises a thermal energy storage means, wherein said thermal energy storage means comprises a phase change material.

7. The system according to claim 1 wherein the power generation apparatus comprises a heat rejection means for expelling waste heat from the power generation apparatus.

8. The system according to claim 7, wherein the heat rejection means expels said waste heat from the system.

9. The system according to claim 7 wherein the heat rejection means comprises a radiator and wherein the cryogenic engine and the power generation apparatus can be decoupled from each other to permit expulsion of said waste heat from the power generation apparatus while the cryogenic engine is not in operation.

10. The system according to claim 7 wherein the heat rejection means comprises a radiator and wherein the cryogenic engine and the power generation apparatus can be partially decoupled from each other to permit expulsion of said waste heat from the power generation apparatus via the heat rejection means while the cryogenic engine is in operation.

11. The system according to claim 7 wherein the cryogenic engine and the power generation apparatus are coupled with each other such that the working fluid of the cryogenic engine provides cooling to the power generation apparatus.

12. The system according to claim 1, further comprising a summing mechanism wherein the cryogenic engine and the power generation apparatus are coupled with each other via the summing mechanism to permit the cryogenic engine and the power generation apparatus to output power via the first and second motive power output members independently of each other and in cooperation with each other.

13. The system according to claim 1, wherein the system is operable in a first mode, a second mode and a third mode, and wherein:

in the first mode, one of the cryogenic engine and the power generation apparatus outputs power via the corresponding one of the first and second motive power output members;

in the second mode, the other of the cryogenic engine and the power generation apparatus outputs power via the corresponding one of the first and second motive power output members; and in the third mode, both of the cryogenic engine and the power generation apparatus output power via the first and second motive power output members.

14. The system according to claim 13 wherein the system is configured to operate in the first mode below a first predetermined system power output threshold and in the second mode above the first predetermined system power output threshold.

15. The system according to claim 14 wherein the system is configured to operate in the second mode below a second predetermined system power output threshold and in the third mode above the second predetermined system power output threshold.

16. The system according to claim 14 wherein the system is configured to operate in the second mode below a second predetermined system power output threshold and in the third mode above the second predetermined system power output threshold and wherein the second predetermined system power output threshold corresponds to a higher system power output than the first predetermined system power output threshold.

17. The system according to claim 1 wherein the working fluid of the cryogenic engine comprises at least one of liquid nitrogen, liquid air, liquefied natural gas, hydrogen, carbon dioxide, oxygen, and argon.

18. The system according to claim 1 wherein the power generation apparatus comprises at least one of an internal combustion (IC) engine and a fuel cell apparatus.

19. A vehicle driven by the system according to claim 1.

20. A static power unit driven by the system according to claim 1.

* * * * *